May 10, 1960  H. J. M. FÖRSTER  2,935,951
PUMP MEANS FOR HYDRAULIC SERVO SYSTEMS
Filed Jan. 25, 1954  3 Sheets-Sheet 1

INVENTOR
HANS-JOACHIM M. FÖRSTER
BY
Dicke and Craig
ATTORNEYS

INVENTOR
HANS-JOACHIM M. FÖRSTER
BY
Dicke and Craig
ATTORNEYS

INVENTOR
HANS-JOACHIM M. FÖRSTER
BY
Dicke and Craig
ATTORNEYS

United States Patent Office 2,935,951
Patented May 10, 1960

2,935,951

PUMP MEANS FOR HYDRAULIC SERVO SYSTEMS

Hans Joachim M. Förster, Stuttgart-Bad Cannstatt, Germany, assignor to Daimler-Benz Aktiengesellschaft, Stuttgart-Unterturkheim, Germany Application January 25, 1954, Serial No. 405,667

Claims priority, application Germany January 29, 1953

10 Claims. (Cl. 103—4)

The present invention relates to a servo mechanism for a plurality of individual auxiliary systems serving as loads for the servo mechanism.

More particularly, the present invention relates to a servo mechanism for a plurality of individual outputs forming auxiliary actuating mechanisms in motor vehicles which comprises a pump to deliver the hydraulic servo medium driven either by the engine of the vehicle or the vehicle itself.

It is, accordingly, an object of the present invention to provide a servo mechanism for motor vehicles which is especially suitable to supply a hydraulic servo-medium to a plurality of auxiliary systems which may optionally be actuated by the driver.

It is another object of the present invention to provide a servo mechanism for use with a plurality of loads in a motor vehicle which offers an increased overall operating efficiency and which provides a reduction of the losses in the mechanism.

It is another object of the present invention to provide a servo mechanism supplying a hydraulic servo medium to a plurality of auxiliary systems which comprises a pump which is automatically adjustable to supply an output quantity of the servo medium in response to the instantaneous load demands by the auxiliary systems.

A still further object of the present invention resides in the provision of a piston pump for use with a servo mechanism in motor vehicles which pump includes an output determining member such as a swash plate which is adjusted in dependence on the load requirements.

It is a still further object of the present invention to provide a piston pump for a servo mechanism in connection with auxiliary systems for motor vehicles which is so constructed as to automatically adjust the stroke of the piston to vary the output of the pump in response to the load requirement of the auxiliary system and which supplies upon completion of substantially only a single revolution sufficient quantity of hydraulic servo medium to actuate that auxiliary system which has the greatest quantity requirement for the servo medium.

It is a still further object of the present invention to provide in combination with a variable output piston pump of a servo mechanism an auxiliary pump driven independently of the piston pump to provide for any emergency.

A still further object of the present invention resides in the provision of an auxiliary pump in combination with a variable output pump for a servo mechanism of motor vehicles which includes an automatic change-over mechanism to change from the auxiliary pump to the main piston pump when the output pressure of the main piston pump reaches a predetermined value.

A still further object of the present invention resides in the fact that the servo mechanism is kept under substantially constant pressure at all times.

These and further objects and advantages of the present invention will become more obvious from the following description when taken in connection with the accompanying drawing, which shows for purposes of illustration only several preferred embodiments in accordance with the present invention and wherein.

Figure 1:
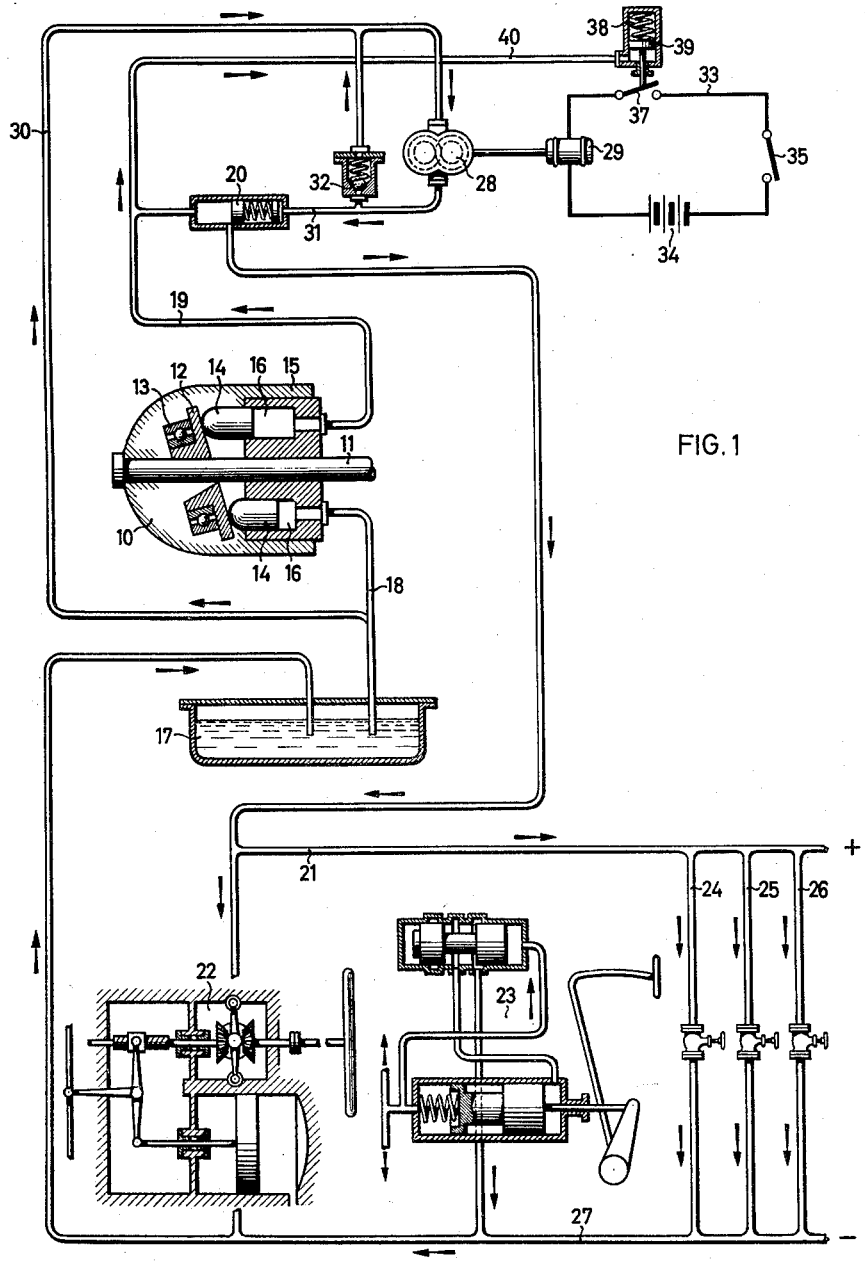
Figure 1 is a schematic diagram of the control system of the servo mechanism in accordance with the present invention.

The development of the construction of motor vehicles more and more proceeds in the direction to actuate individual auxiliary systems or installations in the motor vehicle by means of an auxiliary force. Thus, it is already common use today to connect a great number of loads serving different auxiliary systems to a common seervo system so that a simple actuation of the actuation cycle, as, for example, by means of a push button contact, is only necessary for the actuation of a given auxiliary system. In addition to the actuating devices such as used with the window raising and lowering mechanism, the seat adjusting mechanism, a vehicle lifter mechanism and the like, other auxiliary servo mechanisms such as a servo steering mechanism, a power or servo brake, a curve stabilizer and the like may also be connected to the servo system.

With the installations of the prior art, the servo system is supplied from a pressure reservoir which is brought up to the predetermined high pressure by a pump having fixed discharge characteristics and which will be maintained at such high, predetermined pressure. The pump itself only works for purposes of replenishing the pressure reserevoir against the predetermined high pressure, but is also connected with a bypass line to return the output from the pump back to the hydraulic medium container or reservoir while the pressure reservoir is under or attains the predetermined high pressure, so that the principal quantity of the output from the pump is returned by the bypass line to the fluid container without utilizing the energy thereof.

The present invention effects in particular a lessening of the inherent losses which appear in such prior art systems and consists essentially in that the pump is constructed as an automatically adjustable pump in which the quantity delivered by the output thereof is adjusted to the instantaneous demands of the various loads. For these purposes, the pump may be constructed with variable stroke, especially as a piston pump with a swash plate in which the swash plate is adjustable with respect to its inclination in its position within the pump.

The adjustment of the swash plate may be effected in dependence on the output pressure by means of a special adjustment piston which co-operates with the swash plate in response to changes in the output pressure of the pump.

In the alternative, the adjustment of the swash plate may also be made automatically by utilizing the back pressure of the delivered hydraulic servo medium which acts on the swash plate.

Furthermore, the present invention contemplates a servo mechanism in which an auxiliary pump is provided in addition to the pump driven by the motor or the vehicle, which auxiliary pump is driven independently from the first-named pump and which pumps may supply the servo system with servo medium in an interchangeable manner. Preferably, the auxiliary pump is driven by an electric motor. Furthermore, the auxiliary pump will be de-energized with the energization of the main pump, or the auxiliary pump will be de-energized automatically when the main pump reaches a predetermined output pressure.

A pump with an adjustable discharge or output quantity of hydraulic servo medium supplies exactly as much as is necessary to maintain the required predetermined pressure.

Since a piston pump attains a volumetric degree of efficiency between 95 to 98 percent with a smallest number of rotations during no load, it is obvious that with such pumps a sufficient amount of discharge is available especially in the critical range of the no load or idling range of the motor of the vehicle.

A further advantage of a piston pump with a swash plate resides in the posibility of readily and easily adjusting the output thereof. With such pumps the delivered discharge quantity may be readily adapted to the required load quantities. Furthermore, with such pumps smallest quantities of oil may be turned over by the pistons whereby the resistances due to turbulence, shock and pressure waves as well as the resistances of the lines are reduced to a minimum, and the pressure cycle is constantly under full pressure. Moreover, with increase in load, neither the servo medium needs to be subjected to compression, nor the containers be enlarged.

During standstill of the drive of the pump, it is preferable to arrange the swash plate to a position corresponding to the largest angle of inclination, whereby under such conditions the largest amount of hydraulic liquid is supplied. The pump may be readily so dimensioned, that, for example, a single revolution suffices to cover the maximum demand of the brake servo piston. The high volumetric degree of efficiency is able to assure a high pressure with such quantity.

Experiments have also indicated that with ordinary tolerances in such piston, it is possible to maintain a corresponding high pressure during static conditions for a longer period. If the required quantity surpasses the quantity withdrawn, then the pressure immediately increases and displaces the control piston against a spring so that the pressure oil is applied against the adjusting piston whereupon the swash plate is adjustably displaced.

If a special displacement mechanism for displacing the delivery stroke of the pump, as for example, by changing the inclination of the swash plate, is dispensed with, then an adjustment may take place by the fact that the restoring force of the working piston effects directly the displacement of the adjusting member. The arrangement may be made in such a manner that the restoring force remains approximately constant over the entire adjustment range. For example, a spring constantly urges the swash plate into the position in which it has the greatest inclination, while the restoring force produced by the discharge pressure undertakes the adjustment of the pump automatically.

Preferably, the arrangement is such that the bearing support axis of the swash plate and the piston housing axis coincide with an angle of zero degrees of displacement of the swash plate, while these two axes form an angle with respect to one another in the region of the end position corresponding to the greatest displacement of the swash plate. The displacing springs, which constantly attempt to displace the swash plate in the direction of maximum inclination, are preferably so arranged that the effective radius of action thereof is changed with changes in the inclination of the swash plate so that a characteristic curve of the spring results which provides a decreasing spring force with increase of the displacement angle as a result of displacement of the swash plate about the support bearing axis.

Such a form of construction offers, in addition to savings in the displacement control mechanism, the advantage of a very rapid reaction as no oil is used from the system to produce the displacement.

By providing an additional pump, such as, for example, a pump driven by an electric motor, it is possible to produce a servo force even under conditions, when the motor or the vehicle is not running, i.e. not only in cases of danger in which the motor may accidentally come to a standstill, but also for carrying out those tasks with which it would be particularly disadvantageous or unfavorable to start the motor. The use of the pump which is normally driven by the motor or the vehicle is particularly less advantageous for such purposes because such pump requires a greater starting moment than the electric motors ordinarily used in motor vehicles are able to produce. All of the auxiliary servo systems, which it may be desired to be actuated during standstill of the motor, do not depend on time, i.e., the discharge quantity of the auxiliary pump may consequently be kept small, whereby the electric motor which is used for driving the auxiliary pump may itself operate with a relative high number of rotations.

The de-energization of the auxiliary pump may be effected by a pressure responsive relay which disconnects the electric motor and the corresponding auxiliary drive, as soon as the main pump produces the pressure required for the servo system. On the one hand, the auxiliary pump cannot be energized as long as this pressure is maintained. The energizing circuit for the electric motor driving the auxiliary pump may be connected with the ignition circuit in such a manner that the pump can only be actuated if the ignition is simultaneously energized.

Referring now to the drawing, wherein like reference numerals are used throughout the various views to designate like parts, and more particularly to Figure 1, reference numeral 10 designates the main servo pump, indicated schematically therein, which is driven by means of a shaft 11. Shaft 11 may be driven either from the motor of the vehicle or by the vehicle itself. An adjustable swash plate 12 is supported in the pump housing 15 by means of appropriate ball bearings 13. Pistons 14 support themselves against swash plate 12. Pistons 14 are slidably housed in cylinders 16 provided in the pump housing 15. A plurality of pistons 14, such as, for example, nine pistons may be circumferentially distributed within housing 15.

The hydraulic servo medium, such as oil, is sucked in by pistons 14 from the reservoir 17 over a suction conduit or line 18, and is supplied over a pressure line 19 and a change-over valve 20 to an output line 21 which is connected with the various individual loads of the auxiliary systems, as, for example, a servo steering mechanism 22, a servo brake 23, as well as other loads 24, 25 and 26. The servo steering mechanism 22 and the servo brake 23, which form no part of the present invention, are not described in detail and may be of any suitable form. After passing through the loads, the oil is returned to reservoir 17 over the return line 27.

An auxiliary pump, for example, a gear pump 28, is also connected in the line or conduit system of the servo mechanism. The auxiliary pump 28 is driven by electric motor 29. The auxiliary pump is connected over suction line 30 to the reservoir 17 and is connected to the change-over valve 20 by pressure line 31. A safety valve 32 protecting the auxiliary system against excess pressures connects the pressure line 31 with the suction line 30 of the auxiliary pump.

The auxiliary electric motor is connected with an energization circuit 33 and is energized from an electric power source 34. A switch 35, which may be actuated at will, is connected in series with the energizing circuit 33. Switch 35 may, for example, be formed simultaneously, as the ignition switch. A contactor 37 is connected in series with the energizing circuit 33. Contactor 37 is closed by pressure exerted by spring 38 and is opened by operation of piston 39 operating against the spring pressure of spring 38. The piston 39 is connected to the output line 19 of the main pump 10 by a line 40 so that the piston is at all times under the influence of the pressure which exists in the output line 19 of the main pump 10.

With the motor of the vehicle not operating the pump 10 also does not operate. In order to enable actuation of certain loads, for example, actuation of the roof, of the seats and the like, and possibly of a hydraulic starter, the auxiliary pump 28 is energized by means of the electric motor 29. As no pressure exists in lines 19 and 40, the contactor 37 is closed under the effect of spring 38. With closing of the switch 35, the electric motor 29 is energized and begins to rotate and thus provides pressure in line 31 through operation of the auxiliary pump 28. The change-over valve 20 is displaced toward the left as viewed in Figure 1 and the pressure oil is transmitted from line 31 into line 21 so that pressure is available at the loads in line 21. If the pressure exceeds a predetermined amount, the excess oil is returned to the suction line 30 over the excess pressure valve 32.

If now the engine of the motor vehicle is started, the shaft 11 or the swash plate 12 is rotated therewith and the pump 10 begins to operate and supplies oil under pressure in the output line 19. In this initial condition the swash plate 12 is always adjusted to its largest inclination so that the pump pistons 14 operate to provide their greatest possible output. The pump may be so dimensioned that with only a single or a few rotations it attains full pressure and supplies the required quantity of the servo medium for actuation of the auxiliary servo mechanisms.

When the pressure of the pump 10 exceeds the pressure produced by the auxiliary pump 28, the change-over valve 20 is displaced toward the right as viewed in Figure 1. Simultaneously therewith the piston 39 is raised against the spring pressure exerted thereon by spring 38 whereby the contactor 37 is opened. Opening the contactor 37 de-energizes the auxiliary motor 29 and therewith the auxiliary pump 28.

In addition to a servo steering and a servo brake mechanism, other servo mechanism indicated schematically as loads 24, 25 and 26 may be interconnected with the system, as, for example, a servo clutch mechanism, a window actuating mechanism, a seat displacing mechanism, a roof actuation mechanism, a curve stabilizer, a luggage or spare wheel lifting mechanism, a vehicle lifting mechanism, an infinitely variable ventilation mechanism, a door locking mechanism, an automatic central greasing mechanism, a motor starter, a spring adjustment mechanism, a windshield wiper mechanism and the like.

Figure 2:
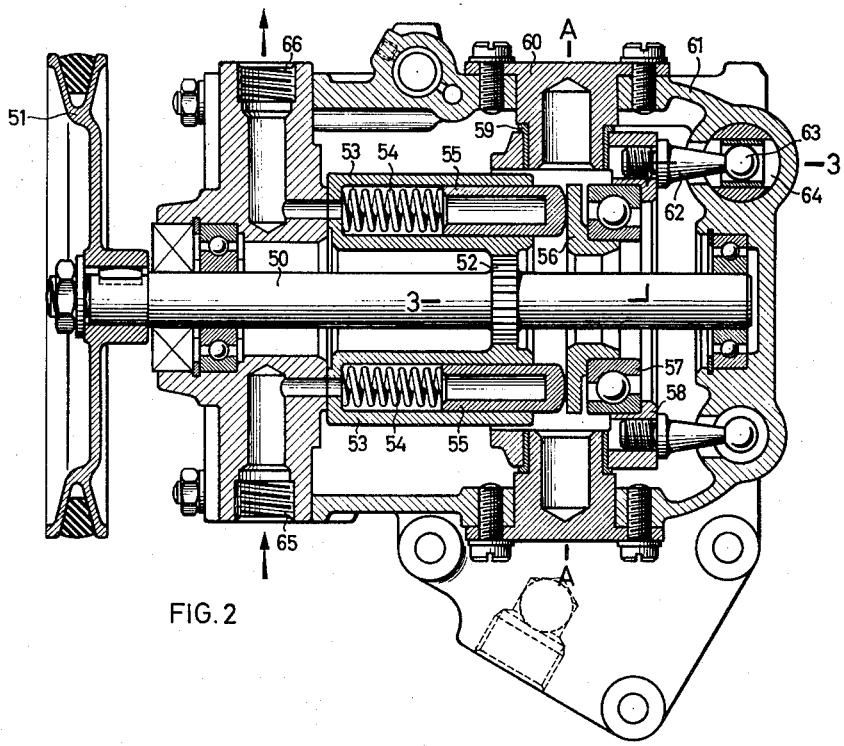
Figure 2 is a cross sectional view through one embodiment of a servo-pump in accordance with the present invention.
Figure 3:
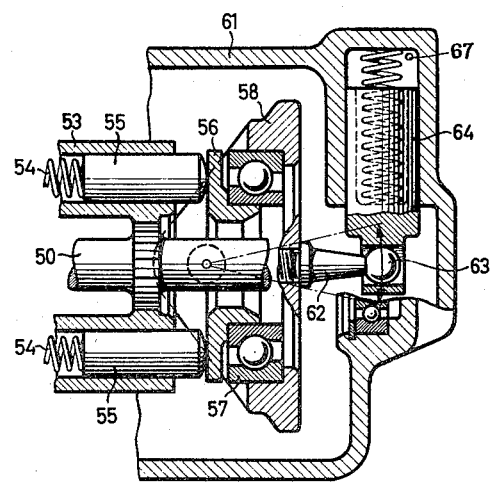
Figure 3 is a partial cross-sectional view of the servo pump illustrated in Figure 2 and taken along line 3—3 of Figure 2.

The servo pump illustrated in Figure 2 comprises a shaft 50 which may be driven in any suitable manner, as, for example, by gears or belt pulleys 51. Shaft 50 in turn drives cylinders 53 by means of gear 52. Pistons 55, which are spring loaded by means of springs 54, slide to and fro within cylinders 53. The pistons 55 are in point contact with and are actuated by the swash plate 56 which is supported on a ring shaped member 58 by means of ball bearings 57. The ring shaped member 58 is pivotally supported on pins 60 within the pump housing 61 by means of appropriate bearings 59 so that the ring together with a swash plate is pivotally adjustable around axis A—A.

For purposes of displacing the ring shaped member 58, it is provided with arms 62 which are rigidly secured thereto as, for instance, by a conventional screw connection and which are operatively connected with a piston 64 each by means of ball joints 63. The pistons 64 are housed in pump housing 61 in a manner to be slidable in a plane perpendicular to the plane of the drawing of Figure 2.

The oil is sucked in at an appropriate place, as, for example, at suction port 65 and is delivered into the pressure line of the servo system at pressure port 66. It is understood, however, that the input channel or suction port 65 and the output channel or pressure port 66 are actually displaced in the pump housing by 90° with respect to the plane of the drawing of Figure 2. The springs 54 or any other springs provided in an appropriate place are arranged in such a manner as to displace the swash plate 56 into its position of greatest inclination around the axis A—A. The pistons 64, through ports 67, are operatively connected to the output line or pressure port 66 in such a way as to be under pressure of the pressure oil supplied in the output of the pump. With increasing pressure in the pressure line or port 66, the pistons 64 are displaced whereby the ring shaped member 58 together with the swash plate 56 are adjusted to the central null position.

If the ring shaped member 58 with the swash plate 56 is adjusted to an inclined position, then the pump pistons 55 are moved to and fro for one stroke with each revolution of the shaft 50 as is well known, whereby the length of the stroke and the therewith connected discharge quantity of the pump depends on the inclination of the swash plate 56 about its axis A—A.

Figure 4:
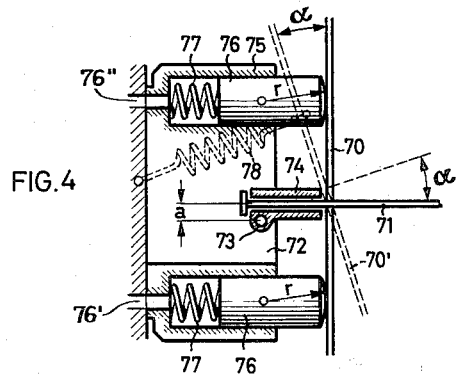
Figure 4 is a schematic presentation of another embodiment of a servo pump in accordance with the present invention and Figure 5 is a diagram of the characteristics of the pump illustrated in Figure 4.

In the embodiment illustrated in Figure 4, the swash plate 70 with shaft 71 driven by the motor is pivotally supported within housing 72 in a bearing 74, which has pivotal axis 73, whereby the pivotal axis is displaced a distance $a$ with respect to the center of the bearing 74. The pump pistons 76 which draw in oil through the intake ports 76' and discharge it through the discharge ports 76", are under the influence of springs 77. A schematically illustrated spring 78 tends to displace the swash plate 70 into the inclined position 70' indicated in dotted lines in Figure 4 under an angle $\alpha$ with respect to the central axis of the bearing 74. The more inclined the position of the swash plate 70 and of the bearing 74 is, i.e., the greater the angle $\alpha$, the stronger becomes the restoring moment produced by the pump pistons 76 on the swash plate 70 against the force of the spring 78, whereby the restoring moment depends on the size of the distance $a$. With appropriate dimensioning, it is possible that the restoring moment may remain approximately constant with all inclinations of the swash plate 70.

Figure 5:
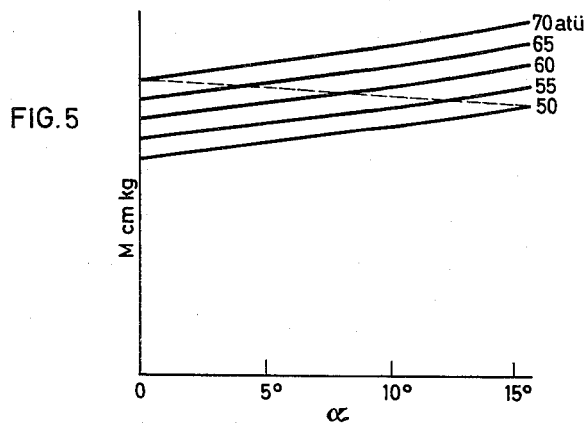

Figure 5 shows a diagram in which the displacement angle is plotted along the abscissa and the moment exerted by the piston 76 along the ordinate and wherein the characteristic line of the spring 78 is indicated by the dotted line.

I claim:

1. A servo-mechanism for a plurality of loads serving auxiliary systems in motor vehicles comprising variable output pump means for delivering a hydraulic servo-medium under pressure, shaft means for driving said pump means, means for automatically adjusting the output of said pump means in response to the requirements of said loads, an auxiliary pump means in parallel with said variable output pump means, means for driving said auxiliary pump means independently of said first-mentioned driving means, and means responsive to the pressure of at least one of said pump means for automatically and alternately interconnecting said first-mentioned pump means or said second-mentioned pump means into said servo mechanism, control means for said auxiliary pump means operatively connected thereto to render said auxiliary pump means operative or inoperative, said control means being actuated only in response to pressure in the output of said first-mentioned pump means.

2. Servo-mechanism according to claim 1, wherein said second-mentioned driving means includes an electric motor drivingly connected with said auxiliary pump means and switch means in the energizing circuit of said motor, and wherein said control means includes switch means and a pressure responsive actuating means for opening said switch means only in response to a predetermined pressure in the output of said variable output pump means.

3. A servo-mechanism for a plurality of loads serving auxiliary systems in motor vehicles comprising variable output piston pump means for delivering a hydraulic servo-medium under pressure including a plurality of circularly disposed parallel pistons and a swash plate cooperating with said pistons, shaft means for driving said piston pump means, means for automatically adjusting said swash plate in response to the instantaneous demand by said loads to vary the output of said piston pump means, auxiliary pump means in parallel with said variable output pump means, means including an electric motor having normally closed switch means in the energizing circuit thereof for driving said auxiliary pump means, and means for automatically and alternately interconnecting said piston pump means or said auxiliary pump means in said servo mechanism, said interconnecting means including a pressure responsive means for preventing said auxiliary pump from being rendered inoperative by the pressure in the output thereof, said interconnecting means further being operative only in response to the pressure in the output of said piston pump means and including a pressure responsive actuating means for opening said switch means in response to a predetermined pressure in the output of said first-mentioned piston pump means, said adjusting means being operative to provide a substantially constant returning moment on said swash plate and including pivotal support means for said swash plate eccentrically disposed with respect to the main bearing axis thereof, and spring means exerting decreasing spring pressure on said swash plate during pivotal movement about said support means.

4. A servo-mechanism for a plurality of loads serving auxiliary systems in motor vehicles comprising variable output piston pump means for delivering a hydraulic servo-medium under pressure including a plurality of circularly disposed parallel pistons and a swash plate cooperating with said pistons, shaft means for driving said piston pump means, means for automatically adjusting said swash plate in response to the instantaneous demand by said loads to vary the output of said piston pump means, an auxiliary pump means in parallel with said variable output pump means, means including an electric motor having normally closed switch means in the energizing circuit thereof for driving said auxiliary pump means, and means for automatically and alternately interconnecting said piston pump means or said auxiliary pump means into said servo mechanism, said interconnecting means including a pressure responsive means for preventing said auxiliary pump from being rendered inoperative by the pressure in the output thereof, said interconnecting means further being operative only in response to the pressure in the output of said piston pump means and including a pressure responsive actuating means for opening said switch means in response to a predetermined pressure in the output of said piston pump means, said piston pump means in the no-load position thereof producing with substantially a single revolution sufficient quantity of hydraulic servo-medium to cover the demand of the load having maximum hydraulic servo-medium requirements.

5. A piston pump for supplying a hydraulic servo medium in dependence on the instantaneous loading requirements comprising a pump housing, a plurality of circularly disposed pistons in said housing, and a swash plate rotatably mounted about a fixed axis within said housing, cooperating with said pistons, shaft means for driving said piston pump, adjusting means for automatically adjusting said swash plate about said axis in response to the instantaneous load requirements to correspondingly vary the output of said piston, said adjusting means including a plurality of actuating arms secured to said swash plate in balanced relationship with respect to the center thereof and lying in planes substantially perpendicular to said axis, and a plurality of adjusting pistons operated by the pressure of said hydraulic medium produced by said pump during operation thereof to actuate said arms in response to changes in said medium.

6. A piston pump according to claim 5, further comprising a ring-shaped member, bearing means intermediate said swash plate and said ring-shaped member, and fastening means in said ring-shaped member for securing therein said actuating arms, said swash plate also been substantially ring-shaped.

7. A servo-mechanism for use with a plurality of auxiliary systems in motor vehicles comprising piston pump means for supplying a hydraulic servo-medium including a plurality of circularly disposed pistons and a swash plate rotatably mounted about a fixed axis in said pump means and cooperating with said pistons, said axis extending in a plane including the points of contact between said pistons and said swash plate, spring means directly acting on said pistons for keeping the same in sliding contact at all times with said swash plate, shaft means for driving said piston pump means, and adjusting means for automatically adjusting said swash plate about said axis in response to the instantaneous load demand of said auxiliary systems to vary the output of said piston pump means, said adjusting means including a plurality of actuating arms secured to said swash plate in balanced relationship with respect to the center thereof and lying in planes substantially perpendicular to said axis, and a plurality of adjusting pistons operated by said hydraulic medium to actuate said arms in response to changes in said medium.

8. Servo-mechanism according to claim 7, further comprising a ring-shaped member, and bearing means for supporting said swash plate on said ring-shaped member, said ring-shaped member being provided with securing means for receiving said actuating arms, and said swash plate also being substantially ring-shaped.

9. A servo-mechanism for a plurality of loads serving auxiliary systems in motor vehicles comprising piston pump means including a plurality of pistons and a swash plate cooperating with said pistons, drive means for producing a relative rotation between said pump means and said swash plate, and adjusting means for automatically adjusting the output of said piston pump means in response to the instantaneous demands by said loads to provide a substantially constant returning moment on said swash plate, said adjusting means including pivotal support means for said swash plate eccentrically disposed with respect to the main bearing axis of said swash plate, and spring means exerting decreasing spring pressure on said swash plate during pivotal movement about said support means.

10. A piston pump for supplying a hydraulic servo medium in dependence on the instantaneous load requirements comprising a pump housing, a plurality of circularly disposed pistons in said housing, and a swash plate rotatably mounted about a fixed axis within said housing and cooperating with said pistons, said axis extending in a plane including the points of contact between said pistons and said swash plate, spring means directly acting on said pistons for keeping the same in sliding contact at all times with said swash plate, shaft means for driving said piston pump, adjusting means for automatically adjusting said swash plate about said axis in response to the instantaneous load requirements to vary the output of said piston pump, said adjusting means including a plurality of actuating arms secured to said swash plate in balanced relationship with respect to the center thereof and lying in planes substantially perpendicular to said axis, and a plurality of adjusting pistons operated by the pressure of said hydraulic medium produced by said pump during operation thereof to actuate said arms in response to changes in said medium.

References Cited in the file of this patent

UNITED STATES PATENTS

| | | |
|---|---|---|
| 1,743,005 | Resler | Jan. 7, 1930 |
| 2,299,235 | Snader et al. | Oct. 20, 1942 |
| 2,323,519 | Dean | July 6, 1943 |
| 2,403,913 | Ellis | July 16, 1946 |
| 2,455,062 | Ifield | Nov. 30, 1948 |
| 2,462,971 | Huber | Mar. 1, 1949 |
| 2,502,546 | Adams | Apr. 4, 1950 |
| 2,543,624 | Gabriel | Feb. 27, 1951 |
| 2,619,041 | Born | Nov. 25, 1952 |
| 2,622,400 | Greer | Dec. 23, 1952 |
| 2,640,433 | Mathys | June 2, 1953 |
| 2,674,854 | Church | Apr. 13, 1954 |
| 2,735,367 | Kenney | Feb. 21, 1956 |
| 2,757,612 | Shaw | Aug. 7, 1956 |
| 2,753,803 | Lawrence | July 10, 1956 |